United States Patent [19]
Young

[11] 3,791,725
[45] Feb. 12, 1974

[54] PROJECTION SYSTEM EMPLOYING ADJUSTABLE MIRROR FOR IMAGE FRAMING

[75] Inventor: Richard W. Young, Wellesley Hills, Mass.

[73] Assignee: Polaroid Corporation, Cambridge, Mass.

[22] Filed: Dec. 6, 1971

[21] Appl. No.: 204,869

[52] U.S. Cl. .............................. 352/129, 352/160
[51] Int. Cl. ..................... G03b 21/00, G03b 21/46
[58] Field of Search ........... 352/104, 129, 119, 160

[56] References Cited
UNITED STATES PATENTS

| | | | |
|---|---|---|---|
| 1,596,012 | 8/1926 | Gauriat | 352/194 X |
| 2,576,586 | 11/1951 | Frankel | 352/119 |
| 1,204,771 | 11/1916 | Hopkins | 352/119 |
| 2,278,781 | 4/1942 | Harrison | 352/119 |
| 3,582,195 | 6/1971 | Pignone | 352/104 X |

Primary Examiner—Monroe H. Hayes
Attorney, Agent, or Firm—Robert F. Peck

[57] ABSTRACT

A photographic projection system employing an oversize projection aperture and adjustable mirror configured for displacement of the projection path relative to the projection screen so as to frame the projected image within the screen border and thereby transmit only the recorded image of the film to an observer. In a preferred embodiment, the system is a rear projection viewer having a projection lens assembly configured for projecting an image of a film section to an adjustably mounted mirror element and from the latter to the rear of a transparent, front-viewing screen. The projection lens assembly is adapted to project an image of a film section which exceeds the area of the recorded image-frame, and the viewing screen includes an opaque border element which conforms to the projected size of the image-frame such that displacement of the mirror element adjusts the projection path relative to the screen and frames the projected image within the screen border.

1 Claim, 4 Drawing Figures

PATENTED FEB 12 1974 3,791,725

INVENTOR.
RICHARD W. YOUNG
BY Brown and Mikulka
and
David R. Thornton
ATTORNEYS

PROJECTION SYSTEM EMPLOYING ADJUSTABLE MIRROR FOR IMAGE FRAMING

BACKGROUND OF THE INVENTION

1. Field of the Invention

This invention relates to photographic projection systems and more particularly to a motion picture projection system having improved image framing.

2. Description of the Prior Art

In photographic systems of the prior art, as for example, in motion picture projection systems with which this application is particularly concerned, image framing is provided by positioning the recorded image of the film in registration with a conforming opening in the aperture plate. Hence, the latter provides an opaque border encompassing the recorded image and thereby transmits to an observer, a projected image respresentative of this recorded image. The lateral position of the recorded images on the film strip, is controlled by film side guides etc. in the camera and is substantially consistent from film to film. Hence, lateral registration of the images with the aperture of the projector is easily achieved by similar side guides. However, since the longitudinal position of the images relative to the film sprocket holes varies from film to film, projector apparatus of the piror art generally provide for manual adjustment of the claw position with respect to the aperture plate for image framing. Inasmuch, as the claw is typically designed for reciprocating motion adapted to incrementally advance the film, the desired manual adjustment generally requires a cumbersome mechanical arrangement which results in increased complexity and cost.

Accordingly, it is an important object of this invention to provide an improved projection system.

Another primary object of this invention is to provide an improved projection method and system providing image framing in accordance with adjustment of the optical projection path.

A further object of this invention is to provide a compact rear projection apparatus having a simplified framing mechanism.

SUMMARY OF THE INVENTION

The apparatus of the invention, which in its illustrated embodiment is particularly adapted for projection of motion picture film, comprises image projection means for projecting image bearing rays from a film section along a given path, framing means interposed in said path for intercepting marginal portions of the projected image so as to provide a border therefor, and means interposed between said image projecting means and said framing means for redirecting the optical path of said image bearing rays relative to said framing means so as to locate a given portion of the image of such film section within said framing means.

In the preferred embodiment, the invention is embodied in a rear projection viewer including a projection lens assembly which is configured to project an image of photographic film along a given path to a pivotally mounted mirror element and from it to the rear of a front viewing screen. The projection lens assembly projects an image of a section of film in excess of a given film frame and the transparent screen is framed within an opaque border which substantially conforms to the projected size of the film frame such that adjustment of the mirror element to displace the projection path relative to the viewing screen serves to locate the image of the film frame within the screen border, and consequently, displays only image portions representative of the film frame to an observer.

BRIEF DESCRIPTION OF THE DRAWINGS

The novel features that are considered characteristic of the invention are set forth with particularity in the appended claims. The invention itself, however, both as to its organization and its method of operation together with additional objects and advantages thereof will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
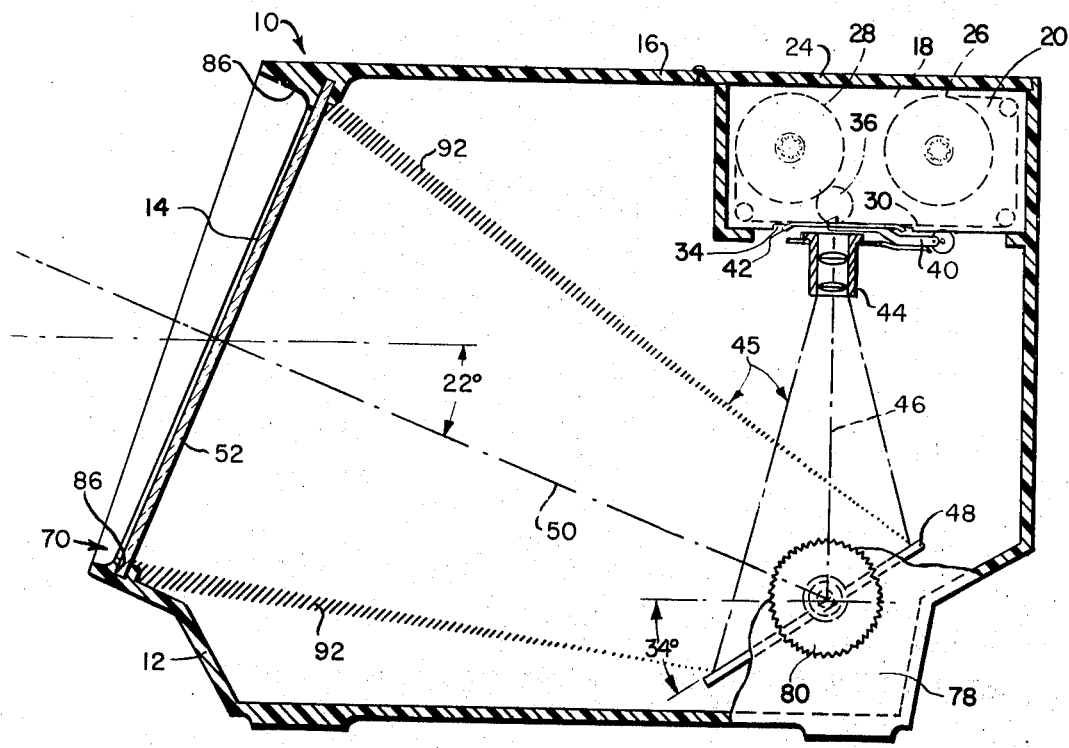
FIG. 1 is a diagrammatic view in section of a motion picture viewer embodying the features of this invention.
Figures 2, 3:
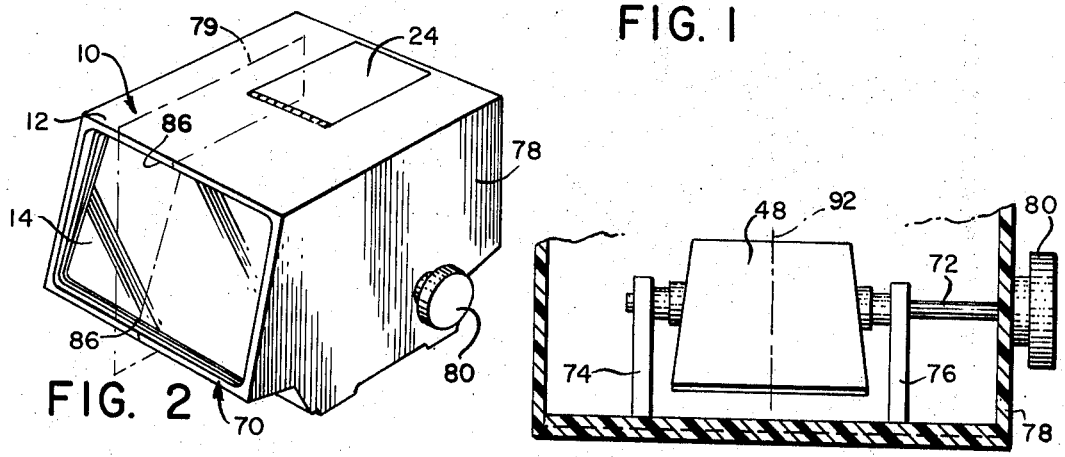
FIG. 2 is a view in perspective view of the apparatus shown in FIG. 1.
FIG. 3 is a fragmentary view in elevation of the mirror arrangement shown in FIG. 1.

As shown in FIGS. 1 and 2, the photographic projection system of the present invention preferably takes the form of a rear projection view 10 comprising a boxlike housing 12 defined in part by a viewing screen 14. Positioned rearwardly of screen 14 and in adjoining relation to the top surface 16 of the housing 12, is a cassette-receiving well 18 which is adapted to hold a motion picture film cassette 20 as shown in FIG. 1. Pivotally mounted at the forward edge of the well 18 is a door member 24 which controls access to the cassette well.

The cassette 20, which may for example, be a multipurpose cassette such as described in the copending application Ser. 813,469 of Rogers B. Downey filed on Apr. 4, 1969, now issued on Sept. 28, 1971 as U.S. Pat No. 3,608,455 which is designed for exposure processing and projection without removal of the film strip from the cassette, comprises a generally flat parallelepiped casing enclosing a pair of motion picture film spools 26 and 28 upon which a motion picture film 30 is disposed for transport between one spool and the other, in an arrangement where portions of the film are advanced across a cassette opening 34 which facilitates projection of the images recorded on the film.

In this cassette, the opening 34 serves to facilitate both exposure and projection inasmuch as it permits image bearing light rays to impinge on incremental sections of the film strip 30 progressively presented thereat so as to facilitate exposure and subsequently to permit light rays from an external source (not shown) to be directed through the incremental sections outwardly of the cassette to facilitate projection operations. For the latter operation, means are also provided in the cassette 20 for permitting entrance of suitable illumination and for redirecting such illumination in a downward direction through the film 30 and out of the opening 34. For example, an opening or aperture 36 is provided in one side wall of the cassette 20 and, a reflector element (not shown) such as a mirror or prism is included within the cassette to redirect light, entering aperture 36, through the incremental sections of the film 30 and out of the cassette opening 34. Hence, a conventional illuminating means (not shown) such as a projection lamp or the like is mounted in the viewer apparatus 10 so as to suitably direct illumination into the aperture 36. Further, the cassette 20 includes a support plate (not shown) mounted behind the film 30 in adjoining relation to the opening 34 which is adapted to cooperate with an aperture plate 42 of the projector 10 to slidably engage the film and locate it in the projection plane.

Also included within housing 12 in adjoining relation to the cassette-receiving well 18 are means (not shown) for driving the spools 26 and 28 and for advancing film 30 across opening 34. For example, appropriate drive shafts (not shown) are adapted to engage the spools 26 and 28 so as to suitably rotate them, and a conventional claw arrangement 40 shown in FIG. 1 is adapted to engage the film sprocket holes 37 (shown in FIG. 4) so as to intermittently advance the film 30 across the opening 34.

Mounted beneath the cassette-receiving well 18 and in registration with the cassette opening 34 is the aperture plate 42 and a lens assembly 44 which are configured to project a beam of light 45, transmitted from the cassette opening 34, vertically downward along an optical axis 46 to a reflecting means, such as a mirror element 48, and from the latter along a second projection path 50 to the rear 52 of the transparent screen 14. In the illustrated embodiment, a particularly compact viewer employing a single mirror and tilted viewing screen such as described in the commonly assigned copending application Ser. No. 174,373 of Philip G. Baker et al, filed on Aug. 19, 1971 is employed. In this embodiment, the mirror 48 in its center position in inclined at an angle of approximately 34° to the horizontal and hence redirects the beam from the optical axis 46 along the second axis 50 which is inclined by approximately 22° to the horizontal as shown. The front viewing screen 14 is disposed perpendicular to this axis 50 and includes means for redirecting its transmitted or viewed image slightly downward in compensation for the upward inclination of this axis 50. This arrangement economically provides a highly compact viewer whole profile as viewed from the front of the unit is essentially determined by the screen size.

In the apparatus of the invention, the aperture plate 42 and the lens assembly 44 are adapted to project an image of section of film strip (as later explained in detail in regards to FIG. 4) which exceeds the area of the film frame or scene recorded on the film strip 30. In conjunction with this projection of an oversized film section, the transparent screen 14 is encompassed by and retained within a mask-like opaque border 70, which is substantially equal or slightly less than the area of the projected image of the scene, and hence, is configured to intercept marginal portions of the projected beam 45 and thereby frame the image transmitted to an observer. Herein, the film frame image is defined as the image of the scene previously recorded on the film by the camera. The projection image is defined as that image formed by the cross section of the projection beam taken at a given plane and, in accordance with the invention, is greater in area than the projection of the scene when viewed in that plane. Finally, the viewed image is defined as that portion of the projection beam which is transmitted to or seen by the viewer. In accordance with the invention, the viewed image is less than the area of the projected image or beam and, in fact, substantially conforms or is slightly less than the area of the image of the scene.

For actual framing adjustment, mirror 48 is pivotally mounted in the projector as shown in FIG. 3. That is, mirror 48 is affixed to shaft 72 which is, in turn, pivotally mounted in supports 74 and 76 and extended through the side wall 78 of the viewer to a knob 80 which permits manual adjustment of the position of the mirror with respect to the lens assembly 44 and the screen 14. Hence, mirror 48 is mounted for angular displacement around an axis which is parallel to film 30 and in a plane normal to the longitudinal axis of the film such that rotation of mirror 48 deflects optical axis 50 along the vertical axis of the screen 14. Stated otherwise, the mirror 48 is mounted to permit varying of the projection path relative to the screen 14 in a plane 79 which bisects the screen and conforms to the longitudinal axis of projected image of the film frame. For economy and increased compactness of the unit, the mirror 48 is trapezoidal shaped inasmuch as the beam cross section in the plane of the mirror is narrower towards the rear of the viewer 10 in accordance with the ever widening beam 45 and the angle of inclination of the mirror to the beam axis 46.

Figure 4:
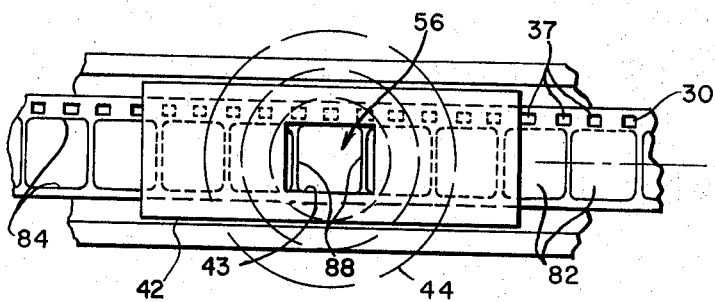
FIG. 4 is a fragmentary plan view illustrating the relationship between the photographic film and the projection lens assembly shown in FIG. 1.

Deflection of the optical path in this plane only is provided since only longitudinal framing of the recorded scenes is required in this embodiment. The latter results from the fact that, as shown in FIG. 4, the aperture or opening 43 of aperture plate 42 only exceeds the length of the scene as recorded, or that is, exceeds the length of the film frames 82 while it substantially conforms to or is slightly less than the width of these scene frames. Consequently, as in conventional projector apparatus, the lateral margins 84 of the film frame 82 are positioned in registration with the aperture 43, for example, by side film guides (not shown) or other arrangements which align the longitudinal axis 90 of the film frames with the center of the aperture. However, as previously indicated the latter exceeds the longitudinal dimension of the film frames 82 such that it does not frame their longitudinal margins or edges 88. It should be understood of course that the opening of the cassette 10 and its pressure plate (not shown) must also provide an aperture which exceeds the area of the recorded scene and, in fact, exceeds the area of aperture 43 if the beam of light 45 is to be larger than the recorded scene at the plane of the film.

As shown in FIG. 4, the aperture 43 and the lens assembly 44 transmit an image of a film section 56 (conforming to the size of aperture 43) which exceeds the length of the film frame 82 and the screen's opaque border 70 or at least its top and bottom edges 86 as shown in FIGS. 1 and 2 functions to frame the longitudinal limits of the scene. Hence, the top and bottom edges 86 of the border 70 exclude transmission of the top and bottom portions 92 of the beam 45. Consequently, these border edges 86 in cooperation with the adjustable mirror 48 are designed to effectively frame the projection of the recorded scene such that the viewed image does not include light rays from film portions outside of the film frame 82.

For proper operation, the mirror 48 in all of its operational positions is designed to be of sufficient area to intercept and redirect the entire beam 45 emanating from the projection lens 44 towards the screen 14. Hence, the mirror 48 is made to exceed the beam dimension impinging on the mirror as measured on an axis 92 perpendicular to shaft 72 so as to permit mirror variation for the framing adjustment. The length of the mirror, as measured along the axis 92 is, of course, related to the frame displacement required. Preferably, the overall length of the mirror need be only about 10 percent greater than the length illuminated by the beam when the mirror is located at its center position since the angular variation necessary for framing is kept relatively small, e.g. a few degrees inasmuch as, the aperture 43 preferably only exceeds the length of the useful portions of the image frame 82, as measured along its longitudinal axis 90, by approximately 10 percent. This oversized length of the aperture 43 is generally sufficient to permit positioning of successive film frames within the aperture plate opening by conventional claw arrangement inasmuch as the film to film variation between the recorded images and the sprocket holes of the particular film as well as mechanical tolerances of conventional claw mechanisms etc. will generally be much less then 10 percent of the length of the image frame.

In an exemplary embodiment, a projector housing having a front viewing face which includes an opaque border enclosing a rectangular transparent screen approximately 18.3cm. high and 24.4cm. wide was employed. Disposed in the rear of the top surface of the apparatus was a cassette well configured to accept a cassette of the described type and to position it in operative relation with other elements of the housing. In this example, the cassette carried motion picture film having a plurality of image frames which measured about 0.57 cm. wide and 0.42 cm. long, serially arranged along the length of the film strip. Mounted beneath the cassette in operative arrangement with the projection station of the latter was an aperture plate having an opening which measured about 0.53 cm. wide and 0.45 cm. long and a projection lens having a speed of f/.92 and 0,89cm. focal length which produced a track length of approximately 43 cm. from the film to the screen. A trapezoidal mirror measuring approximately 10.1cm. along its base, by 9.8cm. along its top and 8.9cm. in height was positioned at the base of the projector cabinet approximately 12.7cm. below the film and pivotally mounted for rotation of approximately 4° about an axis parallel to both the plane of the aperture plate and the screen. This projection system produced a projection image or beam height in the plane of the screen which measured about 22cm. high such that the screen border intercepted the margins of the beam and permitted a framing adjustment along its vertical axis.

Those familar with the motion picture arts will readily appreciate the novel and highly unique advantages of this invention which provides a projection system having a simplified framing arrangement. In conjunction with projection of an elongated image portion, the adjustable mirror which is adapted for image framing provides a simplified viewer construction including an uncomplicated shuttle arrangement which requires no alteration of its mechanism during operation. The latter eliminates possible film damage due to manual adjustments of the claw motion during projection operations.

It should be understood that this invention may be practiced or embodied in still other ways without departing from the spirit of essential character thereof. Hence, the preferred embodiment wherein is illustrative and not restrictive, the scope of the invention being indicated by the appended claims and all variations which come within the meaning of the claims are intended to be embraced therein.

What is claimed is:

1. A compact motion picture projection apparatus comprising a housing of substantially opaque material, said housing including a transparent viewing screen providing a front surface of said housing, said screen bordered by a substantially opaque portion of said housing which portion forms a masking element disposed around the perimeter of said screen, means for receiving a strip of photographic film having a plurality of substantially uniformly spaced perforations and a plurality of substantailly uniformly spaced recorded scenes of given length arranged along the length of such film strip, such recorded scenes being located longitudinally with respect to such perforations within a predetermined distance so as to provide a predetermined scene-to-perforation tolerance, an aperture plate defining a projection plane located rearwardly of said screen and in adjoining relation to a top surface of said housing, said aperture plate including an aperture substantially equal to the width of such recorded scenes and at least equal in length to the length of such recorded scenes plus such scene-to-perforation tolerance, means for progressively positioning each of such recorded scenes at such projection plane including shuttle means for cooperating with such perforations of said film strip so as to intermittently advance such film strip and progressively locate incremental sections of such film strip over said aperture, said shuttle configured for intermittently advancing each such perforation a predetermined distance so as to progressively locate each such scene over said aperture at a point within a predetermined distance equal to said perforation-to-scene tolerance such that the full length of each such scene is progressively located within the length of said aperture, means for directing light downwardly through each scene and through said aperture along a downward optical path when such scene is located over said aperture so as to project an image of said aperture including an image of such scene along said given path, a reflector element located in said given path for redirecting such image forwardly along a second path to said screen, said masking element enclosing a screen area substantially equal in length and width to the image of such scenes such that the masking element intercepts the image of said aperture and precludes further transmission of portions thereof exceeding the length of the image of such scene at said screen, said reflector element being pivotally mounted in said housing and configured for rotation around an axis substantially normal to the longitudinal axis of such image, and means coupled to said reflector element and extending exteriorly of said housing so as to be accessible to the operator of said apparatus for initial pivotal adjustment of said reflector element during projection operation whereby such scene images may be positioned within said masking element and other portions of the image of said aperture are masked from view.

* * * * *